US006539662B2

(12) United States Patent
Heath

(10) Patent No.: US 6,539,662 B2
(45) Date of Patent: Apr. 1, 2003

(54) FISHING DEVICE

(76) Inventor: Jimmie D. Heath, 406 S. Barclay, Dewey, OK (US) 74029

( * ) Notice: Subject to any disclaimer, the term of this patent is extended or adjusted under 35 U.S.C. 154(b) by 0 days.

(21) Appl. No.: 09/791,130

(22) Filed: Feb. 22, 2001

(65) Prior Publication Data

US 2002/0112392 A1 Aug. 22, 2002

(51) Int. Cl.⁷ .................... A01K 97/00; A01K 97/11
(52) U.S. Cl. ............................................................. 43/15
(58) Field of Search ................................. 43/15, 16

(56) References Cited

U.S. PATENT DOCUMENTS

| | | | | |
|---|---|---|---|---|
| 2,703,465 A | | 3/1955 | DiStefano | 43/15 |
| 2,744,351 A | * | 5/1956 | Smith | 43/16 |
| 2,770,906 A | * | 11/1956 | Hood | 43/16 |
| 2,804,277 A | | 8/1957 | Kinder | 248/42 |
| 2,944,361 A | * | 7/1960 | Coulter | 43/16 |
| 3,562,947 A | | 2/1971 | Martin | 43/15 |
| 3,699,701 A | | 10/1972 | Jacobs | 43/15 |
| 3,979,852 A | * | 9/1976 | Johnson | 43/16 |
| 4,031,651 A | | 6/1977 | Titze | 43/15 |
| 4,476,645 A | * | 10/1984 | Paarmann | 43/15 |
| 4,676,018 A | * | 6/1987 | Kimball | 43/15 |
| 4,730,408 A | * | 3/1988 | Miller | 43/15 |
| 4,823,493 A | | 4/1989 | Gray | 43/15 |
| 4,993,181 A | | 2/1991 | Cooper | 43/15 |
| 5,345,708 A | | 9/1994 | Loyd | 43/21.2 |
| 5,359,802 A | * | 11/1994 | Gutierrez | 43/16 |
| 5,809,684 A | * | 9/1998 | Carter et al. | 43/16 |
| 5,903,998 A | * | 5/1999 | Hawkins et al. | 43/15 |

* cited by examiner

*Primary Examiner*—Kurt Rowan
(74) *Attorney, Agent, or Firm*—William R. Sharp

(57) ABSTRACT

The invention is a fishing device for use with a fishing rod which carries a fishing line, wherein the fishing device comprises: a support post; a rod holder for securely but removably holding the fishing rod and being pivotally connected to the support post; a resilient member, such as a spring, interconnected between the rod holder and support post; a support arm integrally connected to and transversely extending from the support post adjacent to the rod holder; an extension arm integrally connected to and transversely extending from the support arm so that such extension arm is spaced from the rod holder; an activating lever having a first end portion pivotally connected to the extension arm and an opposing second end portion adapted to receive a portion of the fishing line; a trigger bar having opposing first and second ends, the first end being connected to the first end portion of the activating lever so that such first end is freely turnable with respect to the first end portion; and a trigger retaining member, integrally connected to the support arm, for removably receiving and engaging the second end of the trigger bar. The fishing rod as held by the rod holder can be pivoted to a position in which a portion thereof is in contact with the trigger bar as engaged with the trigger retaining member so as to place the resilient member under tension. A pull on the fishing line by a fish causes the activating lever to pivot and pull the trigger bar out of engagement with the trigger retaining member to thereby release the fishing rod and return the resilient member to a relaxed state. Such release of the fishing rod sets a hook in the mouth of the fish.

17 Claims, 2 Drawing Sheets

FISHING DEVICE

BACKGROUND OF THE INVENTION

The invention relates to a fishing device of the type which holds and supports a fishing rod, and which automatically sets the hook when a fish pulls on the fishing line.

Prior fishing devices of the above-mentioned type have at least one of several disadvantages, including: complex and/or bulky construction; difficulty in use; and an unreliable "trigger" mechanism. This mechanism is designed to be triggered by a pull on the fishing line to thereby release the fishing rod from a position which places an associated spring under tension.

SUMMARY OF THE INVENTION

The problems discussed above are overcome by a fishing device for use with a fishing rod which carries a fishing line, wherein the fishing device comprises: a support post; a rod holder for securely but removably holding the fishing rod and being pivotally connected to the support post; a resilient member, such as a spring, interconnected between the rod holder and support post; a support arm integrally connected to and transversely extending from the support post adjacent to the rod holder; an extension arm integrally connected to and transversely extending from the support arm so that such extension arm is spaced from the rod holder; an activating lever having a first end portion pivotally connected to the extension arm and an opposing second end portion adapted to receive a portion of the fishing line; a trigger bar having opposing first and second ends, the first end being connected to the first end portion of the activating lever so that such first end is freely turnable with respect to the first end portion; a trigger retaining member, integrally connected to the support arm, for removably receiving and engaging the second end of the trigger bar; wherein the fishing rod as held by the rod holder can be pivoted to a position in which a portion thereof is in contact with the trigger bar as engaged with the trigger retaining member so as to place the resilient member under tension, and wherein a pull on the fishing line by a fish causes the activating lever to pivot and pull the trigger bar out of engagement with the trigger retaining member to thereby release the fishing rod and return the resilient member to a relaxed state.

In accordance with a preferred embodiment of the fishing device as oriented in use with the support post upright and vertical, the fishing rod is released from an approximately horizontal position to result in a quick upward movement which sets a hook, as connected at the end of the fishing line, in the mouth of the fish. As will be more apparent from the following description of the preferred embodiment, the fishing device of the invention is simple and compact in construction, easy to use, and highly reliable in its operation.

DESCRIPTION OF A PREFERRED EMBODIMENT

In the following description and throughout this application, where a component of the fishing device is described as being "integrally connected" to another component, this means that such components are fixedly connected to one another or actually integral with one another.

Figure 1:
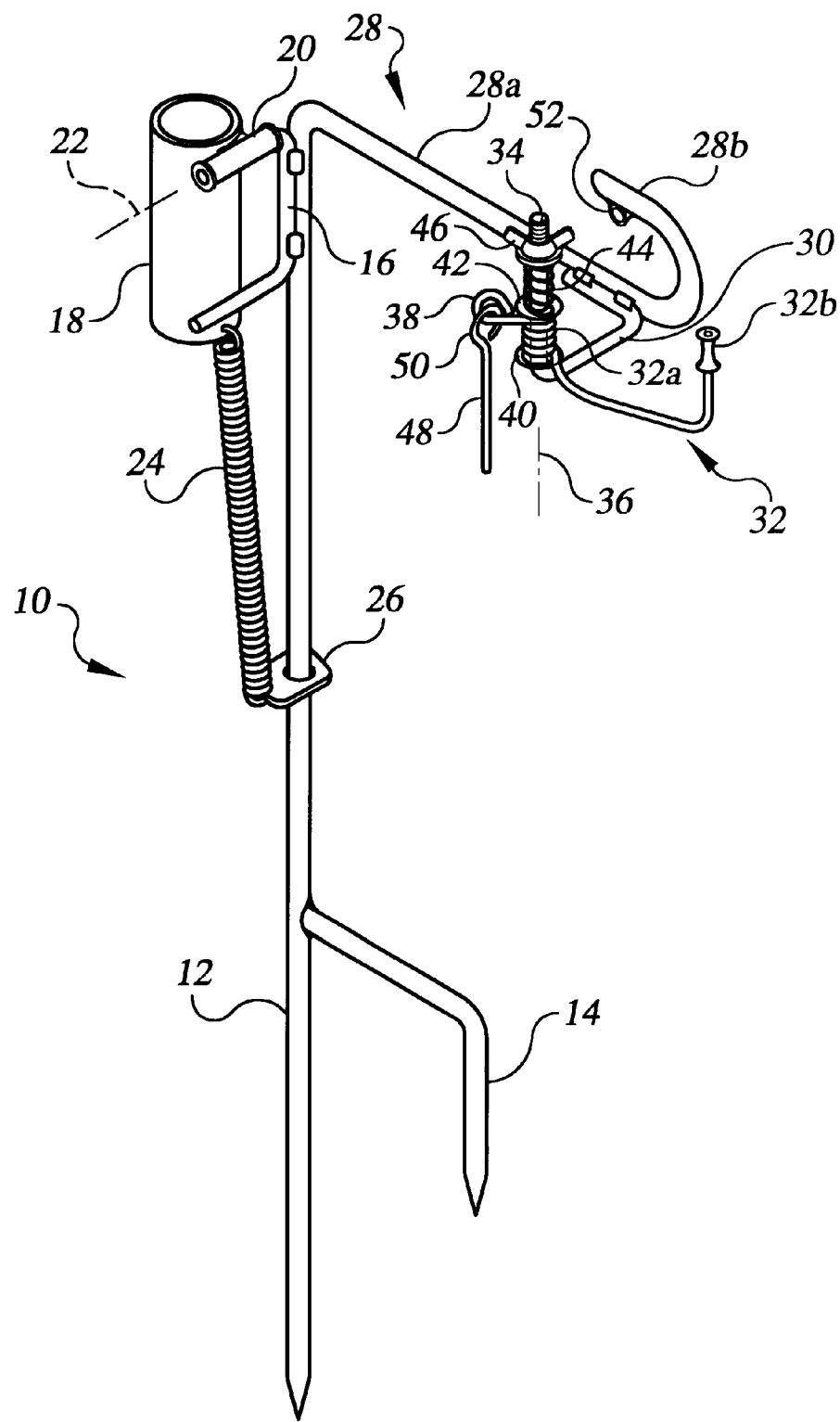
FIG. 1 is a perspective view of a preferred embodiment of the invention.

Referring to FIG. 1, the illustrated fishing device 10 is shown as oriented for use. Fishing device 10 includes a substantially straight and vertical support post 12 having a pointed lower end. A branched extension 14 is integrally connected to the side of support post 12 by welds, and has a downwardly extending portion with a lower pointed end positioned above the lower pointed end of support post 12. Accordingly, the lower portion of support post 12 and the downwardly extending portion of branched extension 14 can be inserted into the ground. Branched extension 14 functions to stabilize support post 12. Alternatively, the above-mentioned portions of support post 12 and branched extension 14 could be held in the illustrated upright position by a suitable bracket (not shown) secured to a boat or dock, or by an appropriately weighted anchoring device (such as a receptacle filled with water, not shown) having holes for receiving such portions therethrough.

A U-shaped member 16, having upper and lower legs, is integrally connected by welds to support post 12 adjacent its upper end. A rod holder 18, which comprises a tubular member, is pivotally connected to support post 12 by means of a sleeve 20 welded to the rod holder and received over the upper leg of U-shaped member 16. Rod holder 18 is accordingly pivotal about a pivot axis 22 substantially perpendicular to support post 12. The lower leg of U-shaped member 16 serves as a stop for rod holder 18. As shown, a spring 24 is interconnected between rod holder 18 and support post 12. More specifically, spring 24 has an upper end fixedly connected to rod holder 18 and a lower end fixedly connected to an adjustment plate 26 having a hole receiving support post 12 therethrough. Adjustment plate 26 is, therefore, longitudinally slidable along support post 12.

A support arm 28 has a substantially straight portion 28a integrally connected to and transversely extending from the upper end of support post 12 adjacent to rod holder 18. Such straight portion 28a is most preferably integral with support post 12. Support arm 28 also has an end portion 28b which bends inwardly over straight portion 28a as shown. An extension arm 30 is integrally connected to straight portion 28a by means of a perpendicular leg integral with the extension arm and welded to straight portion 28a. Extension arm 30 transversely extends from straight portion 28a of support arm 28 such that it is spaced from rod holder 18 and adjacent to end portion 28b.

An activating lever 32 has opposing end portions 32a and 32b. Activating lever 32 is pivotally connected to extension arm 30 by means of a pivot shaft 34 integrally connected to the outer end of the extension arm. End portion 32a is coiled around a lower portion of pivot shaft 34 (shown in broken lines) to allow pivotal movement about the pivot shaft and pivot axis 36 defined thereby. As shown, pivot axis 36 is substantially parallel to support post 12. End portion 32a terminates in an eye 38 adjacent to pivot shaft 34. A washer 40 is received over the lower portion of pivot shaft 34 below end portion 32a of activating lever 32. Another washer 42 is received over pivot shaft 34 above end portion 32a and below a spring 44 as received over an upper portion of the pivot shaft. Pivot shaft 34 has a threaded, free end portion for threadedly receiving a wing nut 46 having a washer welded thereto. Accordingly, wing nut 46 can be twisted in either rotational direction to adjust the tension under which end portion 32a of activating lever 32 pivots about pivot shaft 34. Finally with regard to activating lever 32, its end portion 32b is enlarged and tapers inwardly for a purpose more clearly apparent below.

A trigger bar 48 has a free end and an opposing end formed as an eye 50. Eye 50 is interconnected, as shown, with eye 38 of end portion 32a so that eye 50 is freely turnable with respect to such end portion of activating lever 32. A trigger retaining member 52 is integrally connected by at least one weld to end portion 28b of support arm 28. Trigger retaining member 52 is preferably cylindrical in shape and defines an opening sized to receive the free end of trigger bar 48, as will be explained further below.

With respect to details of construction, the components of fishing device 10 are preferably made from sturdy and durable metallic materials. Support post 12 and support arm 28 are preferably formed from a solid metallic rod.

Figure 2:
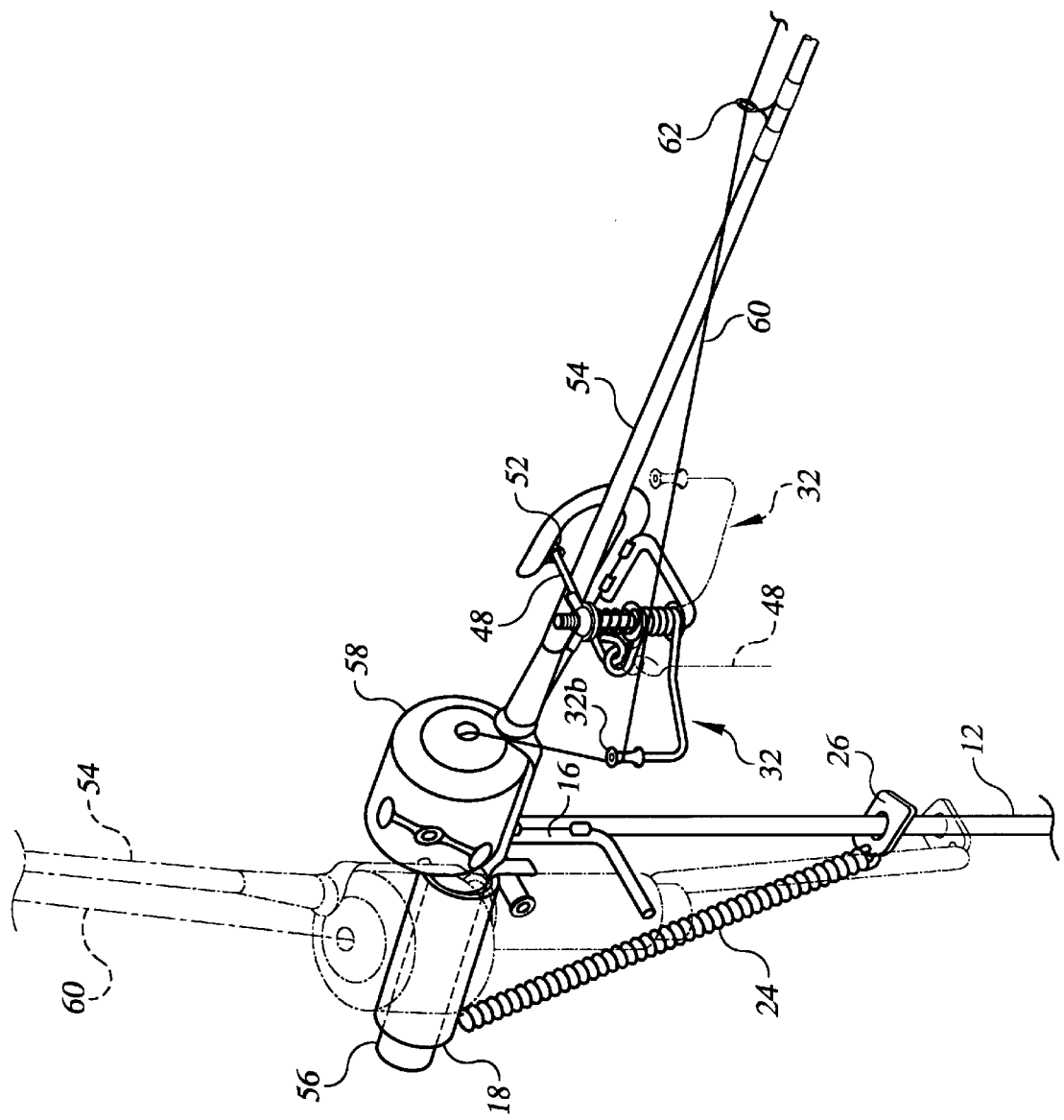
FIG. 2 is a partial perspective view of the device shown in FIG. 1 holding a fishing rod in a position for fishing.

Referring to FIG. 2, a fishing rod 54 is shown as having its handle 56 securely but removably received in rod holder 18. The portion of handle 56 extending through rod holder 18 is shown in broken lines. Fishing rod 54 as held by rod holder 18 is pivoted to a position which places spring 24 under tension, which results in frictional engagement of adjustment plate 26 with support post 12. Adjustment plate 26 is longitudinally positioned upon support post 12 to provide the desired tension on spring 24. High placement of adjustment plate 26 on support post 12 results in a low tension, while low placement of the adjustment plate results in a high tension.

FIG. 2 further shows activating lever 32 pivoted to a first pivotal position which allows the free end of trigger bar 48 to be removably received in the opening of trigger retaining member 52. The free end of trigger bar 48, as in a first trigger position, is thereby engaged with trigger retaining member 52. A portion of fishing rod 54 extends under and in contact with trigger bar 48 so as to hold the fishing rod in the illustrated approximately horizontal position, which places spring 24 under tension as discussed above. A fishing reel 58, as attached to fishing rod 54 adjacent to handle 56, has fishing line 60 extending therefrom, around the inwardly tapered end portion 32b of the activating lever, and then through the first eyelet 62 of fishing rod 54. The remainder of fishing rod 54 and associated fishing line 60 beyond eyelet 62, as well as a baited hook connected to the end of the fishing line, are not shown.

A bite by a fish will exert a pull on fishing line 60, and cause activating lever 32 to pivot and pull trigger bar 48 out of engagement with trigger retaining member 52 to thereby release fishing rod 54 and return spring 24 to a relaxed state. Fishing rod 54 pivots upwardly in a quick motion and fishing line 60 disengages from end portion 32b of the activating lever, thereby setting the hook in the mouth of the fish. As shown in phantom lines (broken lines alternating with dots), fishing rod 54 and associated fishing line 60 assume an approximately vertical position when stopped in their pivotal and upward movement by the lower leg of U-shaped member 16, and various components of the fishing device that change in position assume the illustrated positions, including activating lever 32 as pivoted to a second pivotal position in which trigger bar 48 as in a second trigger position has its free end removed from and out of engagement with trigger retaining member 52.

It should also be noted that the fishing device could, if desired, be used to simply hold the fishing rod for fishing without placing the resilient member under tension for setting the hook.

Obviously, many modifications and variations of the present invention are possible in light of the above teachings. It is, therefore, to be understood that within the scope of the appended claims, the invention can be practiced otherwise than as specifically described.

That which is claimed is:

1. A fishing device for use with a fishing rod which carries a fishing line, comprising:
   a support post;
   a rod holder for securely but removably holding the fishing rod and being pivotally connected to the support post;
   a resilient member interconnected between the rod holder and support post;
   a support arm integrally connected to and transversely extending from the support post adjacent to the rod holder;
   an extension arm integrally connected to and transversely extending from the support arm so that such extension arm is spaced from the rod holder;
   an activating lever having a first end portion pivotally connected to the extension arm and an opposing second end portion adapted to receive a portion of the fishing line;
   a trigger bar having opposing first and second ends, the first end being connected to the first end portion of the activating lever so that such first end is freely turnable with respect to the first end portion;
   a trigger retaining member, integrally connected to the support arm, for removably receiving and engaging the second end of the trigger bar, the trigger retaining member being adapted to receive and engage the second end of the trigger bar as in a first position, and the trigger bar being movable by pivoting of the activating lever to a second position in which the trigger bar, having its first end connected to the first end portion of the activating lever, has its second end removed from and out of engagement with the trigger retaining member as integrally connected to the support arm;
   whereby the fishing rod as held by the rod holder can be pivoted to a position in which a portion thereof is in contact with the trigger bar as in the first position so as to place the resilient member under tension, and whereby a pull on the fishing line by a fish causes the activating lever to pivot and move the trigger bar to the second position to thereby release the fishing rod and return the resilient member to a relaxed state.

2. A fishing device as recited in claim 1 wherein the support post is substantially straight and has a pointed end.

3. A fishing device as recited in claim 1 wherein the rod holder is pivotal about a pivot axis substantially perpendicular to the support post.

4. A fishing device as recited in claim 3 wherein the fishing rod is of the type having a handle, and wherein the rod holder comprises a tubular member for receiving the handle therein.

5. A fishing device as recited in claim 1 further comprising an adjustment plate having a hole receiving the support post therethrough, and wherein the resilient member has a first end fixedly connected to the rod holder and a second end fixedly connected to the adjustment plate, whereby the adjustment plate is longitudinally slidable along the support post to adjust the aforementioned tension on the resilient member which results in frictional engagement of the adjustment plate with the support post.

6. A fishing device as recited in claim 5 wherein the resilient member comprises a spring.

7. A fishing device as recited in claim 1 wherein the support arm is integral with the support post, and has a substantially straight portion extending from the support post and an end portion which bends inwardly.

8. A fishing device as recited in claim 7 wherein the extension arm is integrally connected to the straight portion of the support arm adjacent to the end portion of the support arm.

9. A fishing device as recited in claim 8 wherein the first end portion of the activating lever is pivotally connected to the extension arm by means of a pivot shaft integrally connected to the extension arm and defining a pivot axis substantially parallel to the support post.

10. A fishing device as recited in claim 9 wherein the first end portion of the activating lever is coiled around the pivot shaft to allow pivotal movement about the pivot shaft and its associated pivot axis, the first end portion terminating in an eye adjacent to the pivot shaft.

11. A fishing device as recited in claim 10 wherein the first end of the trigger bar is formed as an eye, which is interconnected with the eye of the first end portion of the activating lever so as to be freely turnable with respect to such first end portion.

12. A fishing device as recited in claim 11 further comprising a tension adjustment means for adjusting the tension under which the first end portion of the activating lever pivots about the pivot shaft.

13. A fishing device as recited in claim 7 wherein the trigger retaining member is integrally connected to the end portion of the support arm.

14. A fishing device as recited in claim 13 wherein the trigger retaining member has an opening for receiving the second end of the trigger bar.

15. A fishing device as recited in claim 14 wherein the trigger retaining member is substantially cylindrical in shape.

16. A fishing device for use with a fishing rod which carries a fishing line, comprising:
   a support post;
   a rod holder for securely but removably holding the fishing rod and being pivotally connected to the support post;
   a resilient member interconnected between the rod holder and support post;
   a support arm integral with and transversely extending from the support post adjacent to the rod holder, the support arm having a substantially straight portion extending from the support post and an end portion which bends inwardly;
   an extension arm integrally connected to and transversely extending from the straight portion of the support arm adjacent to the end portion of the support arm, the extension arm being spaced from the rod holder;
   a pivot shaft integrally connected to the extension arm and defining a pivot axis substantially parallel to the support post, the pivot shaft having a threaded, free end portion;
   an activating lever having a first end portion coiled around the pivot shaft to allow pivotal movement about the pivot shaft and its associated pivot axis, the first end portion terminating in an eye adjacent to the pivot shaft, and wherein the activating lever also has an opposing second end portion adapted to receive a portion of the fishing line;
   a tension adjustment means which includes an adjustment nut, threadedly received on the threaded, free end portion of the pivot shaft, for adjusting the tension under which the first end portion of the activating lever pivots about the pivot shaft;
   a trigger bar having opposing first and second ends, the first end being formed as an eye, which is interconnected with the eye of the first end portion of the activating lever so as to be freely turnable with respect to such first end portion;
   a trigger retaining member, integrally connected to the support arm, for removably receiving and engaging the second end of the trigger bar;
   wherein the fishing rod as held by the rod holder can be pivoted to a position in which a portion thereof is in contact with the trigger bar as engaged with the trigger retaining member so as to place the resilient member under tension, and wherein a pull on the fishing line by a fish causes the activating lever to pivot and pull the trigger bar out of engagement with the trigger retaining member to thereby release the fishing rod and return the resilient member to a relaxed state.

17. A fishing device for use with a fishing rod which carries a fishing line, comprising:
   a support post;
   a rod holder for securely but removably holding the fishing rod and being pivotally connected to the support post;
   a resilient member interconnected between the rod holder and support post;
   a support arm integrally connected to and transversely extending from the support post adjacent to the rod holder;
   an extension arm integrally connected to and transversely extending from the support arm so that such extension arm is spaced from the rod holder;
   an activating lever having a first end portion pivotally connected to the extension arm and an opposing second end portion adapted to receive a portion of the fishing line;
   a trigger bar having opposing first and second ends, the first end being connected to the first end portion of the activating lever so that such first end is freely turnable with respect to the first end portion;
   a trigger retaining member, integrally connected to the support arm, for removably receiving and engaging the second end of the trigger bar, the trigger retaining member being adapted to receive and engage the second end of the trigger bar as in a first trigger position when the activating lever is in a first pivotal position, the activating lever being pivotable to a second pivotal position in which the trigger bar as in a second trigger position has its second end removed from and out of engagement with the trigger retaining member, wherein the trigger retaining member is integrally connected to the support arm and the first end of the trigger bar is connected to the first end portion of the activating lever in the seconds trigger and second pivotal positions as well as in the first trigger and first pivotal positions;
   whereby the fishing rod as held by the rod holder can be pivoted to a position in which a portion thereof is in contact with the trigger bar as in the first trigger position, corresponding to the first pivotal position of the activating lever, so as to place the resilient member under tension, and whereby a pull on the fishing line by a fish causes the activating lever to pivot from the first pivotal position to the second pivotal position in which the trigger bar is in the second trigger position to thereby release the fishing rod and return the resilient member to a relaxed state.

* * * * *